United States Patent
Fukuda et al.

(10) Patent No.: US 7,041,402 B2
(45) Date of Patent: May 9, 2006

(54) FUEL ELECTRODE FOR SOLID POLYMER ELECTROLYTE FUEL CELL, SOLID POLYMER ELECTROLYTE FUEL CELL AND METHOD FOR CONTROLLING SOLID POLYMER ELECTROLYTE FUEL CELL

(75) Inventors: Kaoru Fukuda, Saitama (JP); Masaki Tani, Saitama (JP); Keisuke Andou, Saitama (JP); Chikara Iwasawa, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 294 days.

(21) Appl. No.: 10/308,190

(22) Filed: Dec. 3, 2002

(65) Prior Publication Data

US 2003/0134181 A1 Jul. 17, 2003

(30) Foreign Application Priority Data

Dec. 3, 2001 (JP) .......................... P. 2001-368964

(51) Int. Cl.
- *H01M 8/00* (2006.01)
- *H01M 8/10* (2006.01)
- *H01M 4/86* (2006.01)

(52) U.S. Cl. .................... 429/13; 429/30; 429/42; 429/44

(58) Field of Classification Search ............ 429/13, 429/30, 42, 44

See application file for complete search history.

(56) References Cited

U.S. PATENT DOCUMENTS

| | | | |
|---|---|---|---|
| 5,358,803 A | * | 10/1994 | Abraham et al. ............ 429/101 |
| 6,146,782 A | | 11/2000 | Wendt et al. .................. 429/42 |
| 6,335,112 B1 | * | 1/2002 | Asukabe et al. ............... 429/30 |

FOREIGN PATENT DOCUMENTS

| | | |
|---|---|---|
| JP | 11-329455 | 11/1999 |
| WO | WO 01/15247 A2 | 3/2001 |
| WO | WO 01/15249 A2 | 3/2001 |
| WO | WO 01/15254 A2 | 3/2001 |
| WO | WO 01/15255 A2 | 3/2001 |

* cited by examiner

*Primary Examiner*—Patrick Joseph Ryan
*Assistant Examiner*—Thomas H. Parsons
(74) *Attorney, Agent, or Firm*—Arent Fox PLLC (57) ABSTRACT

A solid polymer electrolyte fuel cell has a fuel electrode and an oxidant electrode, which face each other via a solid polymer electrolyte membrane. A metallic complex is added to the fuel electrode of the solid polymer electrolyte fuel cell. Since this metallic complex adsorbs oxygen as the oxygen partial pressure at the fuel electrode increases and desorbs oxygen as the oxygen partial pressure decreases, oxygen produced when a reverse voltage is generated can be removed efficiently. It may be possible to prevent the deterioration of or damage to a catalyst material of the fuel cell and the electrolyte membrane.

5 Claims, 3 Drawing Sheets

FUEL ELECTRODE FOR SOLID POLYMER ELECTROLYTE FUEL CELL, SOLID POLYMER ELECTROLYTE FUEL CELL AND METHOD FOR CONTROLLING SOLID POLYMER ELECTROLYTE FUEL CELL

BACKGROUND OF THE INVENTION

1. Filed of the Invention

The present invention relates to a fuel electrode for a solid polymer electrolyte fuel cell, a solid polymer electrolyte fuel cell and relates to a method for controlling a solid polymer electrolyte fuel cell.

2. Description of the Related Art

Among a number of types of fuel cells such as phosphoric acid fuel cells, molten-carbonate fuel cells, solid electrolyte fuel cells and solid polymer electrolyte fuel cells, the solid polymer electrolyte fuel cells are considered to be promising due to its compact configuration and high-output operations at low temperatures.

In the solid polymer electrolyte fuel cells, hydrogen as fuel is consumed at a fuel electrode, which is an anode. As a result, hydrogen ions and electrons are produced according to an ionization reaction expressed by the following reaction formula (1).

$$2H_2 \rightarrow 4H^+ + 4e \quad (1)$$

In addition, oxygen, hydrogen ions and electrons are consumed at an oxidant electrode, which is a cathode, water is produced due to an ionization reaction expressed by the following reaction formula (2).

$$O_2 + 4H^+ + 4e^- \rightarrow 2H_2O \quad (2)$$

Then, among the products produced from the reaction expressed by the reaction formula (1), hydrogen ions and electrons move from the fuel electrode to the oxidant electrode via an electrolyte comprising a polymer ion exchanging membrane interposed between the fuel electrode and the oxidant electrode for consumption by the reaction expressed by the formula (2). Electrons among the products move from the fuel electrode to the oxidant electrode via an external circuit connecting the fuel electrode with the oxidant electrode for consumption by the reaction expressed by the formula (2).

As this occurs, since the electrolyte of this fuel cell is prepared in an acid environment, the equilibrium potential $E_{H2}$ is expressed by the following Formula 1 from Nernst equation.

$$E_{w_1} = \frac{RT}{2F} \ln \frac{a^2 H^T}{aH_2} \quad \text{[Formula 1]}$$

(In Formula 1, R denotes a gas constant, T denotes Kelvin temperature, F denotes Faraday constant, and a denotes activity.)

In addition, the equilibrium potential $E_{o2}$ of the oxidant electrode of this fuel cell is expressed by the following Formula 2.

$$E_{01} = E_{02} + \frac{RT}{2F} \ln \frac{a^{1/2} o_2 a_{H2}^2}{a_{H_2O}} \quad \text{[Formula 2]}$$

(In Formula 2, $E°_{o2}$ denotes a standard oxygen electrode potential.)

Then, it is the principle of fuel cells that the equilibrium electromotive force $E_{o2} - E_{H2}$ given by Formula 1 and Formula 2 is made to be the electromotive force of the cell.

In mounting the solid polymer electrolyte fuel cells on automobiles, in reality, the solid polymer electrolyte fuel cells are used in the form of a stack (aggregated cells) comprising a combination of several tens to several hundreds of electrode assemblies, each of which is a basic unit of the fuel cell.

Incidentally, in case that a drastic output variation is generated in the fuel cells by drastically accelerating the vehicle, which incorporates a stack comprising solid polymer electrolyte fuel cells, a large amount of current needs to be supplied from the cells by increasing the supply amount of hydrogen as fuel on the fuel electrode side according to the output variation so generated.

However, readiness in controlling the supply lacks, since hydrogen supplied as fuel is in a gaseous state. The supply amount of hydrogen accordance with the increase of current does not increase in real time to follow the variation in output. The supply amount of the hydrogen increases later than a timing when the output variation occurs for supply.

Although the delay in supplying hydrogen is in the order of several seconds, there occurs a shortage of hydrogen as fuel, since the ionization reaction expressed by the reaction formula (1) is promoted at the fuel electrode immediately after the variation in output occurs in order to match the increase of current in association with the variation in output so that hydrogen is consumed more than before the variation in output occurs. Namely, it follows that the fuel cell lacks fuel.

Nonetheless, in order to maintain a large amount of current required by the variation in output, electrons are supplied from the fuel electrode side to compensate for the decrease in the supply amount of electrons by a reaction, which is expressed by the reaction formula 1 in conjunction with the shortage of hydrogen.

It is considered that the reaction then occurring at the fuel electrode is expressed by the following reaction formulae (3) and (4).

$$2H_2O \rightarrow O_2 + 4H^+ + 4e^- \quad (3)$$

$$C + 2H_2O \rightarrow CO_2 + 4H^+ + 4e^- \quad (4)$$

Then, in conjunction with the reactions above the equilibrium potential of the fuel electrode corresponds to $E_{H2}$ expressed by Formula 1 corresponding to the reaction formula (1), $E_{o2}$ expressed by Formula 2 corresponding to the reaction formula (3) and the reaction formula (4).

$$E_{Co_2} = E_{Co_2} + \frac{RT}{2F} \ln \frac{a^{1/2} co_1 a_{H^+}^1}{a^{1/2} ca_{H_2O}} \quad \text{[Formula 3]}$$

(In Formula 3, $E°_{o2}$ denotes a standard carbon dioxide electrode potential.)

$E_{Co2}$ expressed by Formula 3 corresponds to a sum of multiplications of the respective reaction products by constants according to the molar rates thereof, or $kE_{H2} + mE_{o2} + nE_{Co2}$ (k, m, n denotes constants). Then, in this case, the equilibrium electromotive force of the fuel cell is expressed by $E_{o2} - (kE_{H2} + mE_{o2} + nE_{Co2})$, and in the event that the variation in output is large, $E_{o2} < kE_{H2} + mE_{o2} + nE_{Co2}$ and a reverse voltage is generated in the fuel cell. Then, the reverse voltage condition lasts in the order of several seconds until the delayed supply of fuel hydrogen is dissolved as described above.

Then, there is caused a problem that as this occurs, on the fuel electrode side carbon used as a catalyst carrier in a catalyst layer constituting the fuel electrode is corroded due to the reaction expressed by the reaction formula (4) to thereby deteriorate the performance of the fuel electrode. Then, this deterioration in the performance of the fuel electrode lowers the generating performance of the fuel cell.

With a view to preventing the occurrence of the problem, conventionally, WO 01/15247 discloses a fuel cell in which a catalyst for promoting the electrolysis of water is mixed into a catalyst layer of a fuel electrode.

In the reference, the corrosion of carbon that carries the catalyst is prevented by enhancing the reaction expressed by the reaction formula (3) and suppressing the reaction expressed by the formula (4) which progresses in parallel with the reaction formula (3).

In the above conventional fuel cell, however, there may be caused a problem that maintaining the moisture retention of the fuel electrode becomes difficult due to the shortage of water happening in conjunction with the electrolysis of water expressed by the reaction formula (3). With a view to preventing the occurrence of the problem, in a fuel cell disclosed in WO 01/15249, PTFE resin or graphite is added to a substrate layer or a catalyst layer so that the water concentration of a fuel electrode is increased.

The corrosion of carbon carrying the catalyst is prevented by enhancing the reaction expressed by the reaction formula (3) while maintaining the moisture retention of the fuel electrode and suppressing the reaction expressed by the reaction formula (4) which progresses in parallel with the reaction of the formula (3).

In addition, in a fuel cell disclosed in WO 01/15255, a catalyst for promoting the electrolysis of water is mixed into a catalyst layer of a fuel electrode. Further, PTFE resin or carbon in the form of graphite is added to a substrate layer or the catalyst layer of the fuel electrode, whereby the reaction expressed by the reaction formula (3) is enhanced while controlling the water concentration of the fuel electrode so as to maintain the moisture retention thereof, whereas the reaction expressed by the reaction formula (4) which progresses in parallel with the reaction of the reaction formula (3) is restrained the corrosion of carbon which carries the catalyst is thereby prevented.

Furthermore, in a fuel cell of WO 01/15254, the deterioration of a material forming a fuel electrode that would occur in association with the reaction expressed by the reaction formula (4) or the like is restrained by increasing the catalyst carrying rate of a catalyst layer or improving the resistance to corrosion of a catalyst carrier.

However, the fuel cells disclosed in the above publications are such as to restrain the corrosion of carbon, and the resistance to reverse voltage cannot be sufficiently satisfied by them.

Incidentally, in the event that the amount of oxygen produced by the reaction expressed by the reaction formula (3) increases, there may be caused by oxygen so produced various problems in a fuel electrode or an electrolyte membrane which constitutes an electrode assembly.

The corrosion of the carbon occurs by the chemical combination of oxygen so produced, and carbon carrying the catalyst, so that resistance of a whole fuel cell is increased.

A reaction occurring then is expressed by the following reaction formula (5).

$$O_2 + C \rightarrow CO_2 \qquad (5)$$

In addition, in many cases, a platinum-alloy catalyst such as using a platinum-ruthenium alloy is used as the material of a catalyst for a fuel cell in order to prevent the CO-poisoning of platinum (Pt), and there may be caused a risk that oxygen produced by the reaction expressed by the reaction formula (3) decomposes the alloy catalyst to deteriorate the catalyzing performance thereof.

The decomposition of the catalyst occurring then is expressed by the following reaction formula (6).

$$O_2 + Pt-Ru \rightarrow Pt + RuO_2 \qquad (6)$$

Platinum (Pt) decomposed by the decomposition reaction expressed by the reaction formula (6) is eventually poisoned by CO.

Then, oxygen produced by the reaction of the reaction formula (3) burns to combine with hydrogen surrounding the fuel electrode, thereby causing a risk that the catalyst layer or the electrolyte membrane is deteriorated or damaged.

In particular, since the conventional ion exchanging resin of fluorine plastic (Nafion by DuPont, Flemion by Asahi Glass or the like) is a high-cost fluorine containing resin, hydrocarbon polymer (polyether ketone) is sometimes used in electrolyte membranes used in fuel cells.

In a case where such hydrocarbon polymer is used, there may occur a risk that the skeleton of the hydrocarbon polymer is broken by oxygen produced by the reaction expressed by the reaction formula (3), whereby the electrolyte membrane is damaged, leading to a risk that the performance of the fuel cell cannot be exhibited.

SUMMARY OF THE INVENTION

It is an object of the invention to provide a fuel electrode having a catalyst layer which can hold its catalyzing performance while a reverse voltage is generated by the shortage of fuel which occurs in conjunction with a drastic change in output.

It is an another object of the invention to provide a solid polymer electrolyte fuel cell having the fuel electrode so provided and an electrolyte membrane which can hold its electrolyzing performance while a reverse voltage is generated.

It is a further object of the invention to provide a method for controlling the solid polymer electrolyte fuel cell which can hold its catalyzing and electrolyzing performances while a reverse voltage is occurring.

In order to solve problems, according to the invention, there is provided a fuel electrode for a solid polymer electrolyte fuel cell having an ion-conducting material, an electron-conducting material and a catalytic material, and to which a metallic complex is added.

In a solid polymer electrolyte fuel cell utilizing this fuel electrode, oxygen generated when a reverse voltage is generated due to a drastic variation in output is adsorbed by the metallic complex added to the fuel electrode. It is possible to prevent the deterioration of the catalyst material in the fuel electrode by the oxygen.

As this occurs, the metallic complex is required to adsorb oxygen as an oxygen partial pressure of the fuel electrode increases within a range of operating temperatures of the fuel cell. Further, the metallic complex is also required to desorb oxygen as the oxygen partial pressure decreases within a range of operating temperatures of the fuel cell.

The metallic complex may adsorb oxygen generated in accordance with an increase of the oxygen partial pressure. The increase of the oxygen partial pressure results from a shortage of fuel at the fuel electrode when the reverse voltage is generated. Such a metallic complex may prevent a deterioration of the catalyst material in the fuel electrode.

In addition, the metallic complex of the invention may desorb the absorbed oxygen in accordance with an decrease of the oxygen partial pressure after the delay in increasing the supply of hydrogen has been dissolved. Thus the metallic complex may keep the function to adsorb and desorb oxygen. Thus, the metallic complex is durable for reuse.

When the oxygen is desorbed, since the amount of the hydrogen as a fuel is as same as when the supply of hydrogen is increased, the partial pressure of the oxygen is not drastically increased so that the deteriorate of the electrolyte membrane in the fuel electrode is restrained.

Accordingly, in the invention, a solid polymer electrolyte fuel cell comprising a fuel electrode and an oxidant electrode which face each other via a solid polymer electrolyte membrane, with a metallic complex being added to the fuel electrode. The metallic complex may adsorb oxygen generated in accordance with an increase of the oxygen partial pressure. The increase of the oxygen partial pressure results from a shortage of fuel at the fuel electrode when the reverse voltage is generated, such a metallic complex may prevent a deterioration of the catalyst material in the fuel electrode.

In order to solve further object of the invention, the metallic complex is required to adsorb oxygen as an oxygen partial pressure of the fuel electrode increases within a range of operating temperatures of the fuel cell. Further, the metallic complex is also required to desorb oxygen as the oxygen partial pressure decreases within a range of operating temperatures of the fuel cell. It is possible not only to prevent the deterioration of the catalyst material in the fuel electrode but also to prevent the deterioration of the solid polymer electrolyte membrane that would otherwise be caused by the oxygen so produced. The metallic complex of the invention may desorb the absorbed oxygen in accordance with an decrease of the oxygen partial pressure after the delay in increasing the supply of hydrogen has been dissolved. Thus the metallic complex may keep the function to adsorb and desorb oxygen. Thus, the metallic complex is durable for reuse.

Further, when the oxygen is desorbed, since the amount of the hydrogen as a fuel is as same as when the supply of hydrogen is increased, the partial pressure of the oxygen is not drastically increased so that the deterioration of the electrolyte membrane in the fuel electrode is restrained. In addition, the deterioration of the solid polymer electrolyte membrane that would otherwise be caused by the oxygen so produced can also be restrained.

In the invention, it is desirable that metallic phthalocyanine or metallic tetraphenyl porphyrin is used as the metallic complex whether the metallic complex is used in the fuel electrode for a fuel cell or the fuel electrode of the fuel cell. Preferred examples of the metallic phthalocyanine are iron phthalocyanine, copper phthalocyanine, zinc phthalocyanine and cobalt phthalocyanine. Preferred examples of the metallic tetraphenyl porphyrin are iron tetraphenyl porphyrin, copper tetraphenyl porphyrin, zinc tetraphenyl porphyrin, and cobalt tetraphenyl porphyrin.

In a case where the high-output solid polymer electrolyte fuel cell comprising the fuel electrode and the oxidant electrode which face each other via the solid polymer electrolyte membrane is used, a method of the invention is to remove oxygen generated in the fuel electrode by an oxygen amount controlling device provided at the fuel electrode in accordance with a fluctuation of output of the solid polymer electrolyte fuel cell when a reverse voltage is generated at the fuel electrode. The deterioration of the solid polymer electrolyte membrane that would otherwise be caused by the oxygen so produced can also be restrained. In addition, the deterioration of the solid polymer electrolyte membrane by the oxygen can also be prevented.

The oxygen amount controlling device that can be used for a mechanical controlling as well as a chemical solution in which an additive is caused to be included in the fuel electrode.

For example, a mechanism can be used in which the removal of oxygen is implemented by drawing in a gas whose specific gravity is larger than that of hydrogen.

In this case, the removal of oxygen by the oxygen amount controlling device may be only for a predetermined time just after the reverse voltage has been generated.

The reverse voltage condition lasts only in the order of several seconds, and the supply amount of hydrogen will have been increased by the time when the reverse voltage is dissolved, and the oxygen partial pressure will have decreased by then. Due to this, there is no case where the oxygen partial pressure drastically increases as seen when the reverse voltage is generated. Consequently, the deterioration of the catalyst material in the fuel electrode can be suppressed effectively only by activating the oxygen amount controlling device in the order of several seconds immediately after the reverse voltage is generated, and additionally, the deterioration of the solid polymer electrolyte membrane by oxygen can also be suppressed effectively.

In addition, it is possible to use as the oxygen amount controlling means an oxygen adsorbing agent which adsorbs oxygen as the oxygen partial pressure as the fuel electrode increases and desorbs the oxygen so adsorbed as the oxygen partial pressure decreases. An oxygen adsorbent agent like this can prevent the deterioration of the catalytic material in the fuel electrode by adsorbing oxygen produced in conjunction with the shortage of fuel at the fuel electrode which occurs when the reverse voltage is generated as the oxygen partial pressure is caused to increase by the production of oxygen. The oxygen adsorbent can also prevent the deterioration of the solid polymer electrolyte membrane by the oxygen so produced. Furthermore, the oxygen adsorbent desorbs the oxygen which the adsorbent has adsorbed as the oxygen partial pressure at the fuel electrode decreases after the delay in increasing the supply amount of hydrogen is dissolved. It is possible to maintain the activity of the function to adsorb and desorb oxygen. Thus, the oxygen adsorbent can be used repeatedly. In addition, since hydrogen, which is fuel, is supplied in an increased amount as has been described above when oxygen is desorbed from the oxygen adsorbent, there is no case where a drastic increase in the oxygen partial pressure as seen when the reverse voltage is generated happens, whereby not only can the deterioration of the catalytic material in the fuel electrode be restrained but also the deterioration of the solid polymer electrolyte membrane by oxygen that would be produced when the reoccurs such a drastic increase in the oxygen partial pressure can be restrained.

Then, it is desirable to use as the oxygen adsorbent metallic phthalocyanine or metallic tetraphenyl porphyrin. Preferred examples of the metallic phtalocyanine are iron phthalocyanine, copper phthalocyanine, zinc phthalocyanine and cobalt phthalocyanine, and preferred examples of the metallic tetraphenyl porphyrin are iron tetraphenyl porphyrin, copper tetraphenyl porphyrin, zinc tetraphenyl porphyrin, and cobalt tetraphenyl porphyrin.

DESCRIPTION OF THE PREFERRED EMBODIMENTS

Figure 1:
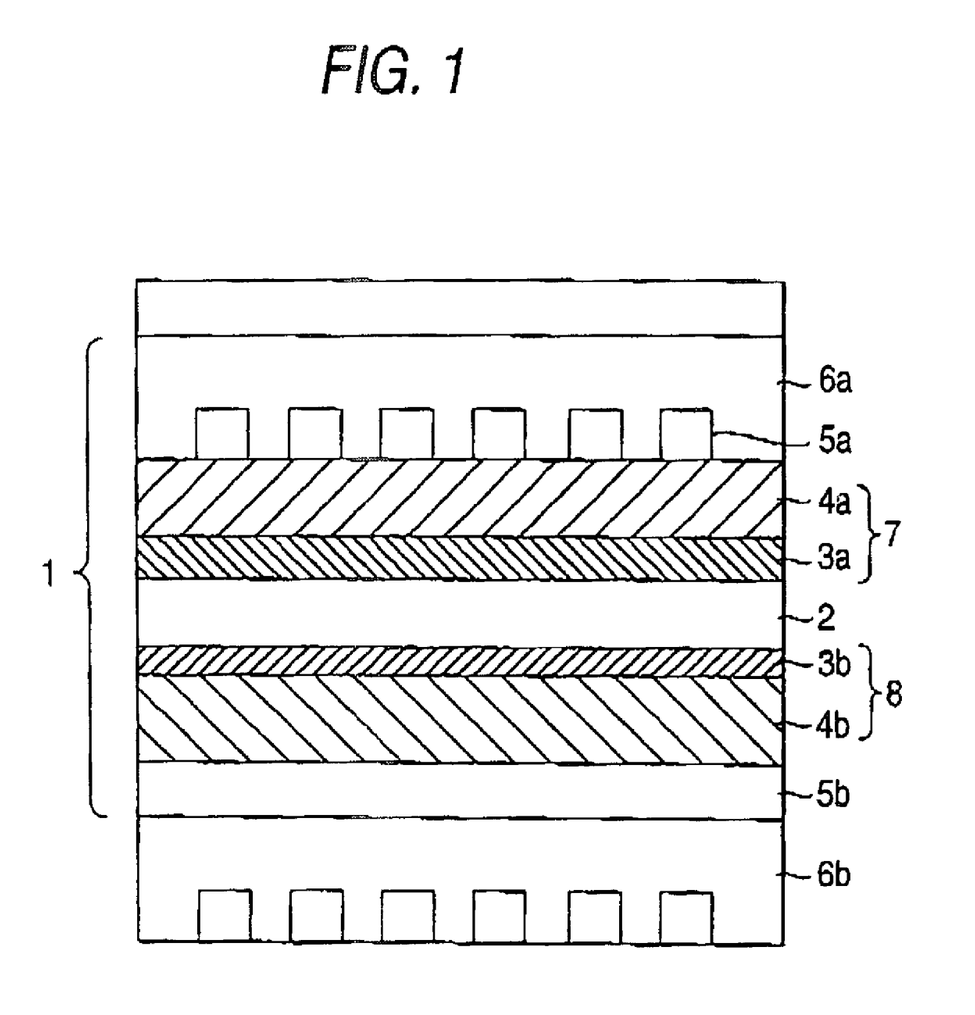
FIG. 1 is a sectional view showing a single cell for a solid polymer electrolyte fuel cell.

FIG. 1 is a sectional view of a single cell which includes a solid polymer electrolyte fuel cell according to the invention.

Referring to FIG. 1, the single cell is formed as follows. A pair of catalyst layers 3a, 3b is laminated to face each other via an electrolyte membrane 2. A pair of diffusion layers 4a, 4b are laminated on the outside of the pair of catalyst layers 3a, 3b. A separator 6a is laminated on the diffusion layer 4a in such a manner as to surround hydrogen-flowing grooves 5a which join with the diffusion layer 4a, respectively. A separator 6b is laminated on the diffusion layer 4b in such a manner as to surround air-flowing grooves 5b which join with the diffusion layer 4b, respectively.

The hydrogen-flowing grooves 5a are provided in such a manner as to extend toward the back of a sheet of paper on which FIG. 1 is depicted. Each of the hydrogen-flowing grooves 5a connected to a hydrogen inlet port (not shown) and a hydrogen outlet port (not shown) of the single cell 1 at ends thereof.

Then, hydrogen gas supplied from the hydrogen inlet port and discharged from the hydrogen outlet port. The hydrogen is brought into contact with the diffusion layer 4a within the hydrogen-flowing grooves 5a in the single cell 1 to thereby be supplied to a fuel electrode 7.

In addition, the air-flowing grooves 5b are provided in such a manner as to extend in a lateral direction of the sheet of paper on which FIG. 1 is depicted.

Each of the air-flowing grooves 5b is connected to an air inlet port (not shown) and an air outlet port (not shown) of the single cell 1 at ends thereof.

Then, air supplied from the air inlet port and discharged from the air outlet port. The air is brought into contact with the diffusion layer 4b to thereby supplied to an oxidant electrode 8.

The fuel electrode 7 including the catalyst layer 3a and the diffusion layer 4a is an anode. The oxidant electrode 8 including the catalyst layer 3b and the diffusion layer 4b is a cathode.

Since the basic construction of a fuel cell is constituted by both the fuel electrode 7 and the oxidant electrode 8 and the electrolyte membrane 2 which is held between both the electrodes, the electrodes 7, 8 and the electrolyte membrane 2 are referred to as "an electrode assembly".

In the electrode assembly, the electrolyte membrane 2 functions to conduct hydrogen ions produced by the reaction expressed by the reaction formula (1) to the oxidant electrode 8, therefore, an ion-conducting material such as an ion-exchanging resin of fluorine plastic is used for the electrolyte membrane.

Additionally, the diffusion layers 4a, 4b of the electrodes of the electrode assembly are formed into porous configurations from carbon, so that hydrogen gas and air containing oxygen as oxidant can be supplied to the catalyst layers 3a, 3b, respectively, in a uniform fashion. The oxygen including in the air is supplied through the contact with the diffusion layers.

The catalyst layer 3a of the fuel electrode 7 of the electrode assembly includes an ion-conducting material such as an ion-exchanging resin of fluorine plastic, a catalytic material such as platinum-ruthenium alloy, an electron-conducting material such as carbon particles and a metallic complex.

This catalyst layer 3a can be prepared using conventionally known methods for mixing carbon particles carrying catalytic materials, a metallic complex and an ion-exchanging resin solution together to produce a catalyst paste. The catalyst paste so produced is applied to a carbon paper including the diffusion layer 4a. The catalyst paste so produced is applied to a membrane.

The catalyst layer 3b of the oxidant electrode 8 of the electrode assembly includes an ion-conducting material such as an ion-exchanging resin of fluorine plastic, a catalytic material such as platinum, and an electron-conducting material such as carbon particles. Similar to the catalyst layer 3a, this catalyst layer 3b can also be prepared using the known methods.

A solid polymer electrolyte fuel cell having the fuel electrode 7, the oxidant electrode 8 and the electrolyte membrane 2 can also be prepared using known methods.

The object of adding the metallic complex to the fuel electrode 7 is to prevent the drastic increase in oxygen concentration in the periphery of the fuel electrode 7 that would otherwise result from the progress of the reaction expressed by the reaction formula (3) at the time the reverse voltage is generated. In the order of 20 to 40 percent by weight of metallic complex may be mixed when preparing the paste to prevent the drastic increase in oxygen concentration in the periphery of the fuel electrode 7.

It is considered that metallic ions ($Me^{2+}$, $Me^{3+}$) in the metallic complex reacts with oxygen produced by the reaction expressed by the reaction formula (3) as the above addition of the metallic complex into the fuel electrode occurs, whereby equilibrium conditions expressed by the following reaction formulae (7) and (8) are produced.

$$Me^{2+}O^{2-}=Me^{3+}—O—O. \qquad (7)$$

$$Me^{3+}—O—O.+Me^{2+}=Me^{3+}—O—O—Me^{3+} \qquad (8)$$

When the oxygen concentration increases the oxygen reacts with the metallic complex according to reactions expressed by the reaction formulae (7) and (8) to produce a super oxo complex, whereby the occurrence of a drastic increase in oxygen concentration in the periphery of the fuel electrode 7 can be prevented.

Incidentally, since the reactions expressed by the reaction formulae (7) and (8) are in equilibrium, in case where the amount of oxygen to be produced decreases, the equilibrium of the reaction formulae (7) and (8) shifts in an opposite direction to the direction of the equilibrium reaction formulae (from the right side to the left side of the equilibrium formulae).

As has been described above, the reverse voltage is generated when an increase in the supply amount of hydrogen as fuel is delayed, and therefore the reverse voltage is not generated when the supply amount of hydrogen increases without delay. The reaction expressed by the reaction formula (3) has almost completed by then. Further, the shift of the reaction formulae (7) and (8) in a normal direction (from the left side to the right side of the equilibrium reaction formulae) has already proceeded by then. As a result, the oxygen concentration relatively decreases.

Then, the shift of the reaction formulae (7) and (8) to the opposite direction starts to thereby produce oxygen again.

However, since the supply amount of hydrogen has already been increased by then in conjunction with the dissolution of the reverse voltage, there is no risk that the oxygen concentration increases drastically when compared with the occasion where the reverse voltage is generated, whereby the deterioration of the materials of the fuel electrode is drastically limited.

It is sufficient that the metallic complex adsorbs oxygen only for several seconds until the reverse voltage is not generated or the supply amount of hydrogen is increased even in a delayed fashion.

As has been described above, the metallic complex has the function to adsorb and desorbs oxygen according to oxygen concentrations, the function of the metallic complex can be effected repeatedly.

Consequently, with an oxygen adsorbent utilizing a metallic complex such as the one that has just been described above being used as the oxygen amount controlling means, oxygen at the fuel electrode can be removed efficiently.

Metallic complexes of metallic phthalocyanine and metallic tetraphenyl porphyrin have the function to adsorb oxygen, and in particular, the metallic tetraphenyl porphyrin is more useful since it can constitute a stable super oxo complex shown by the reaction formula (8).

In addition, iron phthalocyanine, copper phthalocyanine, zinc phthalocyanine and cobalt phthalocyanine can be used as the metallic phthalocyanine, and as the metallic tetraphenyl porphyrin iron tetraphenyl porphyrin, copper tetraphenyl porphyrin, zinc tetraphenyl porphyrin, and cobalt tetraphenyl porphyrin can be used.

According to the embodiment of the invention, the metallic complex is added to the fuel electrode for use as the oxygen amount controlling device by utilizing its function to adsorb oxygen so that oxygen produced at the fuel electrode can be removed.

However, instead of the embodiment in which oxygen is removed by the chemical action, an embodiment may be used in which oxygen produced at the fuel electrode is removed by a mechanical action.

As an example of the mechanical controlling means, a mechanism can be raised in which a gas having a specific gravity larger than that of hydrogen gas is drawn in only for a predetermined period of time (several seconds) immediately a reverse voltage is generated so as to remove oxygen produced at the fuel electrode.

A reverse voltage reproduction test described in Test 1 below is used for evaluation of single cells of a fuel cell.

(Test 1)

Air of 1.0 atm (utilized rate of 40%) is supplied to the oxidant electrode from the air inlet port of the single cell via the air-flowing grooves, and hydrogen of 1.0 atm (utilized rate of 80%) is supplied to the fuel electrode from the hydrogen inlet port of the single cell via the hydrogen-flowing grooves.

The temperature of the cell is set at 80 degrees, air and hydrogen to be supplied are moistened by supplying steam thereto using a bubbling method.

Generating current is taken out from current terminals of the separators A and B of the single cell, and the voltage of the single cell is measured with the current density being set at $0.5 A/cm^2$ by an external variable resistance.

The voltage is measured in the above condition, after 5 minutes has passed with this condition, an external power source is connected to the current terminals of the separators A and B, and while maintaining the current density at $0.5 A/cm^2$, hydrogen gas which is supplied from the hydrogen inlet port is switched to nitrogen gas. The condition that the hydrogen gas is switched to nitrogen gas maintains for 10 seconds.

As this occurs, nitrogen gas which is discharged from the hydrogen outlet port when nitrogen gas is allowed to flow is connected to a gas chromatography so as to identify compositions of the discharged gas.

After 10 seconds has elapsed during which the flow of nitrogen gas is maintained, nitrogen gas is switched back to hydrogen gas, and then the voltage is measured continuously for 5 minutes.

A operation cycle includes a flow of 5-minute power generation (hydrogen gas supply)→10-second fuel shortage (hydrogen gas supply, external power source activation)→5-minute power generation (hydrogen gas supply).

This cycle tests are repeated on single cells several times. Performance of generating electric power after the completion of the cycles tests is measured. The CO poisoning resisting performance of the single cells are performed after the completion of the cycles tests. Identification of gases generated from the single cells is performed when there occurs a shortage of fuel. Analysis of distribution of metallic atoms in the single cells are performed.

[Embodiment 1]

[Fuel Electrode]

A catalyst paste was prepared as follows.

platinum-ruthenium alloy-carrying carbon catalyst, which has 54% of platinum-ruthenium alloy concentration (TEC61E54 produced by Tanaka Rare Metals Industries) and powder of iron phthalocyanine complex (produced by Aldorich) are prepared. Then 10 g of the mixture of the alloy and powder were weighed by a balance to realize a weight ratio of 7 to 3. A catalyst paste was prepared by mixing sufficiently 140 g of ion-exchanging resin solution (Nafion Se5112 produced by Du Pont), 5 g of water and 45 g of isopropyl alcohol with 10 g of the mixture of the alloy and powder. Next, the catalyst paste was adjusted to provide an alloy concentration of $0.3 mg/cm^2$. The adjusted catalyst paste was applied to a carbon paper which had already had a water repellant treatment with PTFE. Thereafter, the applied carbon paper was dried to remove isopropyl alcohol and water to thereby prepare a fuel electrode.

[Oxidant Electrode]

platinum-carrying carbon catalyst includes a carbon black and platinum, which are mixed with a weight ratio of 50 to 50 (TEC10E50E produced by Tanaka Rare Metals Industries).

A catalyst paste was prepared by mixing 10 g of the mixed platinum-carrying carbon catalyst, 100 g of ion-exchanging resin solution (Nafion SE5112 produced by Du Pont) and 5 g of glycerin (produced by Kanto Chemical).

Then, the catalyst paste was adjusted to provide an alloy concentration of $0.3 mg/cm^2$. The catalyst paste was applied to a carbon paper which had already had a water repellant treatment with PTFE. Thereafter, the carbon paper having the catalyst paste was dried to thereby prepare an oxidant electrode.

[Single Cell]

A polymer electrolyte membrane (Nafion produced by Du Pont) was held by the fuel electrode and the oxidant electrode therebetween to thereby prepare an electrode assembly using a hot pressing method.

Then, this electrode assembly was held by a separator A having an air inlet port, air-flowing grooves and an air outlet port provided therein and a separator B having a hydrogen inlet port, hydrogen-flowing grooves and a hydrogen outlet port provided therein between the separators to thereby prepare a single cell.

[Reverse Voltage Reproduction Test]

The reverse voltage reproduction test illustrated in Test 1 was carried out on the single cell for a fuel cell which was obtained in the manner described above.

[Embodiment 2]

A single cell for a fuel cell was prepared as well as in embodiment 1. However, when preparing a catalyst paste for a fuel electrode, iron tetraphenyl porphyrin complex (produced by Aldorich) powder was used as a metallic complex powder instead of the iron phthalocyanine complex (produced by Aldorich) powder. The reverse voltage reproduction test illustrated in Test 1 was carried out on the single cell.

COMPARATIVE EXAMPLE 1

A single cell for a fuel cell was prepared in the same manner as that used in Embodiment 1 except that a catalyst paste for a fuel electrode was prepared without mixing metallic complex. The reverse voltage test illustrated in Test 1 was carried out on the single cell.

Figure 2A:
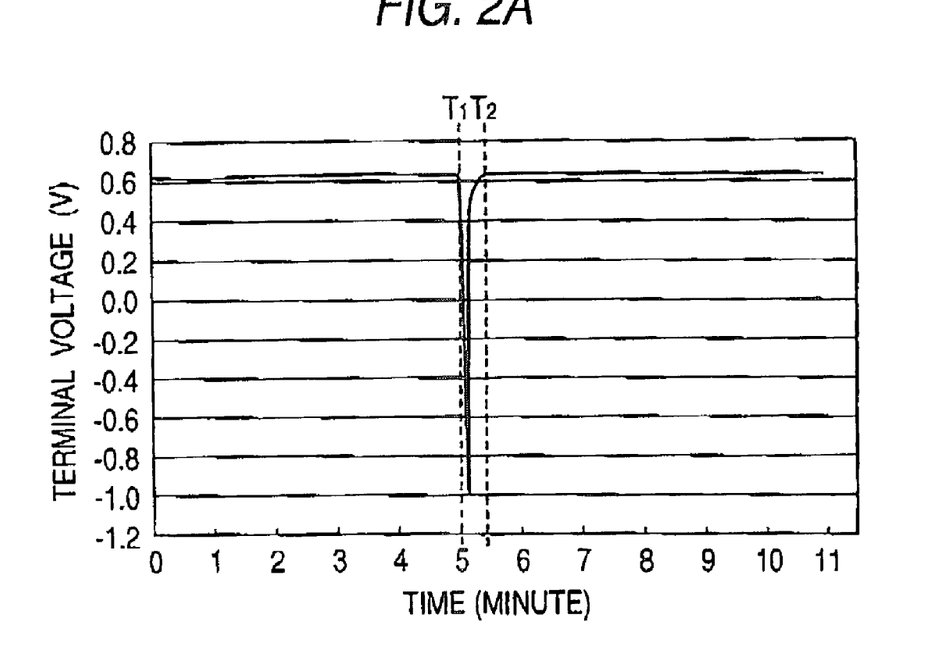
FIG. 2A is a graph showing a deterioration with age in terminal voltage of single cells.
Figure 2B:
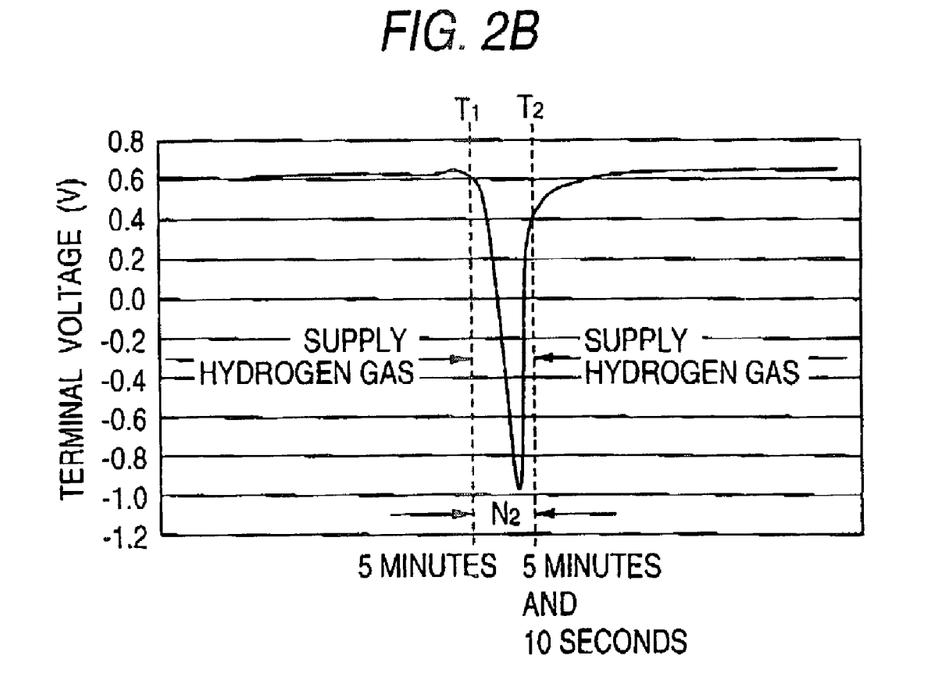
FIG. 2B is an enlarged view showing a portion of the graph in FIG. 2A.

FIG. 2 shows deterioration with time in terminal voltage of the shingle cells of Embodiment 1, Embodiment 2 and Comparative Example 1.

In any of the examples, as shown in FIG. 2A, it is seen that there occurred a reverse voltage in a short period of time ($T_1$–T.) such as 5 minutes after a measurement was initiated.

FIG. 2B is an enlarged view of a portion of FIG. 2A which is a time frame in which the reverse voltage was generated, and it is seen therefrom that the reverse voltage was dissolved just in the order of 10 seconds after the generation of the reverse voltage.

Figure 3:
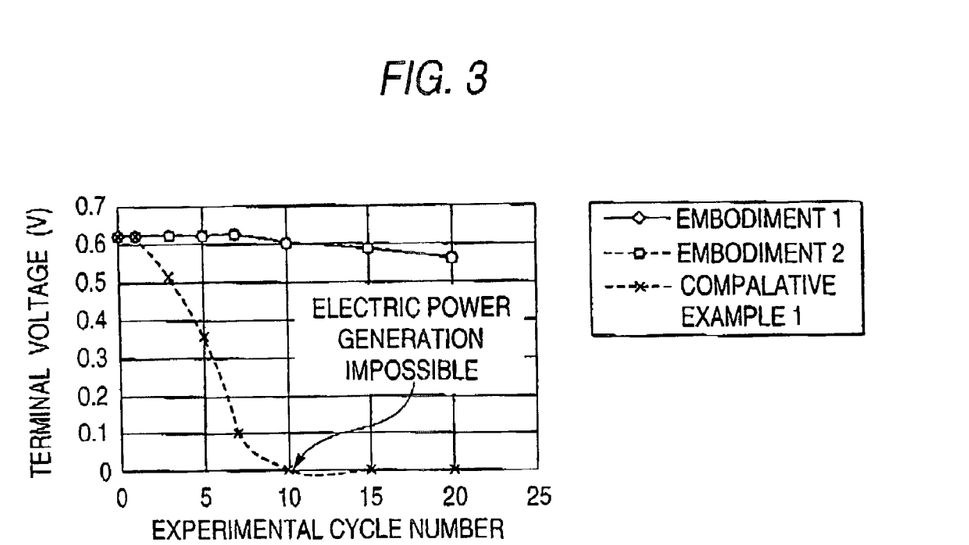
FIG. 3 is a graph showing a power generating performances of single cells after cycle tests are completed.

FIG. 3 shows the results of measurements of the power generating performances of the respective single cells of Embodiment 1, Embodiment 2 and Comparative Example 1 after cycle tests had been carried out on the single cells.

The current density at the time of measurement was 0.5A/cm$^2$ for each single cell. While the power generating performances of the single cells of Embodiment 1 and Embodiment 2 were maintained in good shape. However, in the single cell of Comparative Example 1, no power was generated after the 10$^{th}$ cycle during the cycle test.

Figure 4:
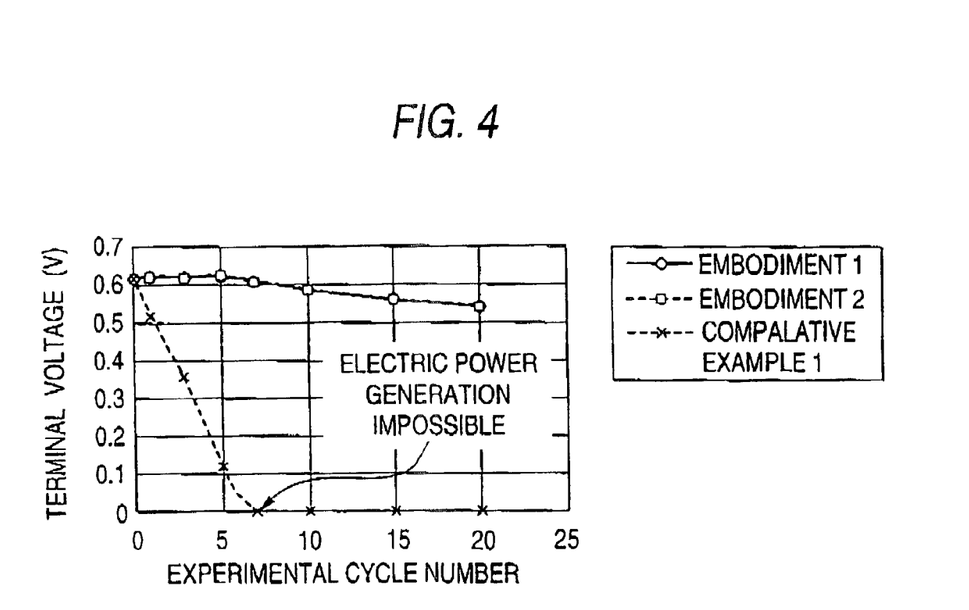
FIG. 4 is a graph showing the CO poisoning resisting performances of the single cells after the cycle tests are completed.

FIG. 4 shows results of measurements of the power generating performances of the respective single cells of Embodiment 1, Embodiment 2 and Comparative Example 1 carried out after adding 50 ppm of CO to the single cells as CO poisoning resisting performances of the respective single cells after the cycle tests.

While the power generating performances of the single cells of Embodiment 1 and Embodiment 2 were maintained in good shape. However, in the single cell of Comparative Example 1, no power generation was obtained after the 7$^{th}$ cycle during the cycle test.

It is recognized from this fact that in Comparative Example 1, the reaction expressed by the reaction formula (6) progressed to result in the loss of catalyst.

Next, the results of identification of gases (excluding hydrogen gas and nitrogen gas) are shown in Table 1 below which were generated when there occurred a shortage of fuel in the respective single cells of Embodiment 1, Embodiment 2 and Comparative Example 1.

TABLE 1

| Time Elapsed | Embodiment 1 | Embodiment 2 | Comparative Example 1 |
| --- | --- | --- | --- |
| 1 to 5 minutes | — | — | — |
| 5 to 5 minutes and 10 seconds | — | — | $CO_2$, $O_2$ |
| 5 minutes and 10 seconds to 7 minutes | $O_2$ | $O_2$ | $CO_2$, $O_2$ |
| 7 to 10 minutes | $O_2$ (Decayed) | $O_2$ (Decayed) | — |

It is recognized from Table 1 that in Comparative Example 1, reactions expressed by the reaction formulae (3) and (4) progressed when the reverse voltage was generated (time elapsed: 5 minutes to 5 minutes and 10 seconds).

In contrast, the iron phthalocyanine and iron tetraphenyl porphyrin absorb oxygen well due to their functions of absorbing and desorbing oxygen in Embodiment 1 and Embodiment 2, respectively, when the reverse voltage was generated. Then, the oxygen adsorbed by the iron complexes was desorbed therefrom when the reverse voltage was immediately dissolved (time elapsed: 5 minutes & 10 seconds to 7 minutes).

Then, after the reverse voltage was dissolved (elapsed time: 7 to 10 minutes), the iron complexes ran out of oxygen adsorbed thereto, and the amount of oxygen desorbed from the iron complexes decreased.

Thus, it is recognized that oxygen identified then shows a tendency of decay.

Furthermore, Table 2 shows results of analysis of the distributions of metallic elements in the respective single cells of Embodiment 1, Embodiment 2 and Comparative Example 1.

TABLE 2

| | Embodiment 1 | Embodiment 2 | Comparative Example 1 |
| --- | --- | --- | --- |
| Fuel Electrode | Pt, Ru, C, S, F, O | Pt, Ru, C, S, F, O | Pt, Ru, C, S, F, O |
| Electrolyte Membrane | C, S, F | C, S, F | C, S, F |
| Oxidant electrode | Pt, C, S, F | Pt, C, S, F | Pt, Ru, C, S, F |

It is recognized from Table 2 that ruthenium element which originally existed in the fuel electrode existed only in the oxidant electrode of Comparative Example 1. It is recognized that in Comparative Example 1, the electrolyte membrane was damaged by oxygen produced through the reaction expressed by the reaction formula (3). Therefore, the ruthenium element in the fuel electrode is migrated through the electrolyte membrane to reach the oxidant electrode.

As described heretofore, since the fuel electrode according to the invention is formed by adding the metallic complex such as iron phthalocyanine and iron tetraphenyl porphyrin, oxygen produced when the reverse voltage is generated can be removed by virtue of the function to adsorb oxygen of the metallic complex. It makes possible to prevent the deterioration of the catalyst material and the catalyst carrier by oxygen so produced.

In addition, since the solid polymer electrolyte fuel cell of the invention include the fuel electrode to which the metallic complex is so added, oxygen can be removed when the reverse voltage is generated, thereby making it possible to prevent the deterioration of or damage to the material of the fuel electrode such as the catalyst material and the electrolyte membrane.

Furthermore, in controlling the solid polymer electrolyte fuel cell by the oxygen amount controlling device utilizing the metallic complex as an oxygen adsorbent, it is sufficient that the removal of oxygen by the oxygen amount controlling device is carried out only for the predetermined period of time immediately the reverse voltage is generated. Therefore, the method for controlling the solid polymer electrolyte fuel cell of the invention provides good efficiency.

Then, with an oxygen adsorbent comprising the metallic complexes which can adsorb or desorbs oxygen according to the fluctuation of the partial pressure of oxygen produced being used as the oxygen amount controlling device, the oxygen adsorbent can be used repeatedly. Invention provides the more efficient control of the solid polymer electrolyte fuel cell. In addition, utilizing the control method of the invention can provide a long-life solid polymer electrolyte fuel cell.

What is claimed is:

1. A solid polymer electrolyte fuel cell comprising:
   a solid polymer electrolyte membrane;
   a fuel electrode comprising:
     an ion-conducting material;
     an electron-conducting material; and
     a catalytic material; and
     an oxygen amount controlling device; and
   an oxidant electrode facing to the fuel electrode via the solid polymer electrolyte membrane,
   wherein a metallic complex is added to the fuel electrode,
   wherein hydrogen is used as a fuel for the solid polymer electrolyte fuel cell, and
   herein the oxygen amount controlling device removes oxygen that is generated in the fuel electrode in accordance with a fluctuation of output of the solid polymer electrolyte fuel cell when a reverse voltage is generated within the solid polymer electrolyte fuel cell;
   wherein the metallic complex comprises metallic tetraphenyl porphyrin.

2. The solid polymer electrolyte fuel cell according to claim 1, wherein the metallic complex adsorbs oxygen in accordance with an increase of an oxygen partial pressure of the fuel electrode within a range of operating temperatures of the fuel cell and wherein the metallic complex desorbs oxygen in accordance with a decrease of the oxygen partial pressure within a range of operating temperatures of the fuel cell.

3. A method for controlling a solid polymer electrolyte fuel cell, the solid polymer electrolyte fuel cell including a fuel electrode and an oxidant electrode, which face each other via a solid polymer electrolyte membrane, the method comprising the step of:
   utilizing hydrogen as a fuel for the solid polymer electrolyte fuel cell; and
   removing oxygen generated in the solid polymer electrolyte fuel cell by an oxygen amount controlling device provided at the fuel electrode in accordance with a fluctuation of output of the solid polymer electrolyte fuel cell when a reverse voltage is generated at the fuel electrode;
   wherein metallic tetraphenyl porphyrin is used as the oxygen amount controlling device.

4. The method for controlling a solid polymer electrolyte fuel cell according to claim 3, wherein
   the oxygen amount controlling device removes the oxygen for a predetermined period of time after the reverse voltage is generated.

5. The method for controlling a solid polymer electrolyte fuel cell according to claim 3, wherein
   the oxygen amount controlling device absorbs the oxygen in accordance with an increase of an oxygen partial pressure of the fuel and wherein the oxygen amount controlling device discharges the absorbed oxygen in accordance with a decrease of the oxygen partial pressure.

* * * * *